B. STERN.
AUTOMOBILE HEADLIGHT.
APPLICATION FILED JULY 18, 1921.
1,429,173. Patented Sept. 12, 1922.
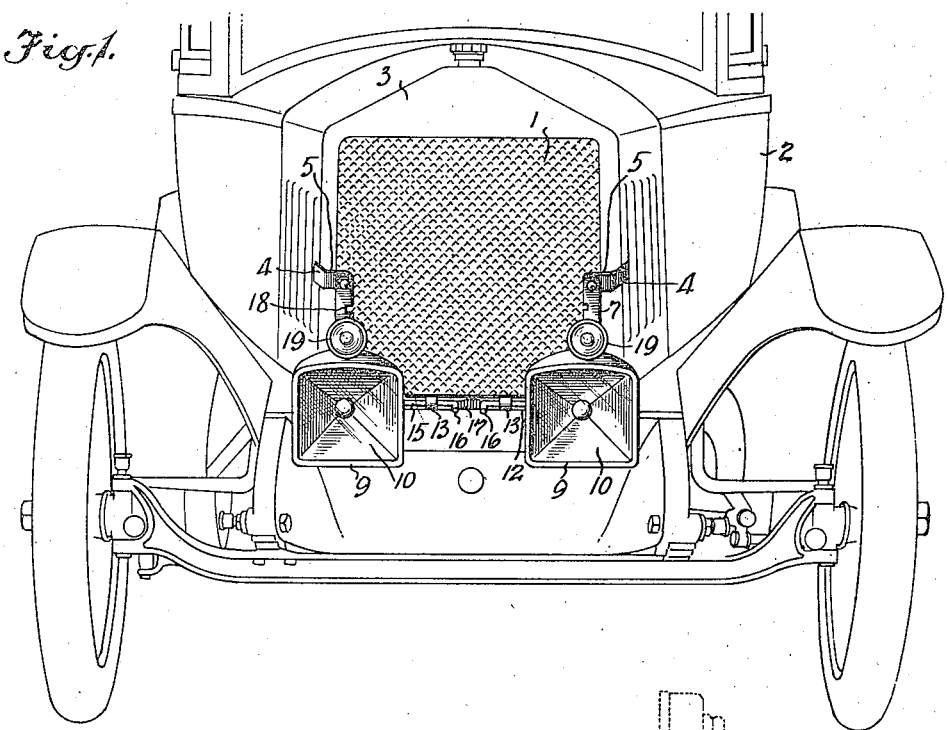
Fig. 1.
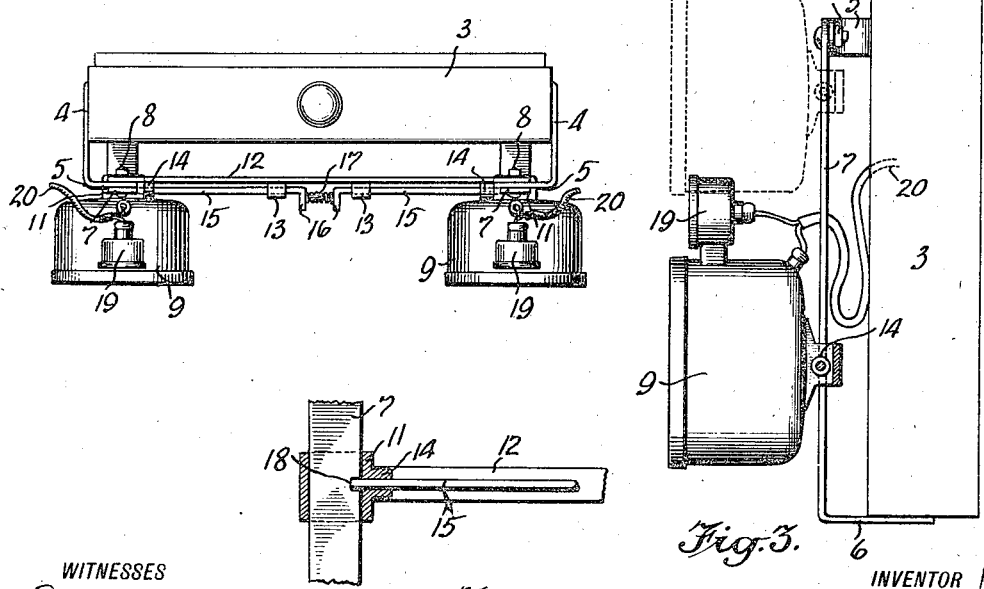
Fig. 2.
Fig. 4.
Fig. 3.
WITNESSES
Geo. W. Naylor
F. J. Foster
INVENTOR
B. STERN
BY Munn & Co.
ATTORNEYS Patented Sept. 12, 1922.

1,429,173

UNITED STATES PATENT OFFICE.

BERNHARD STERN, OF NEW YORK, N. Y.

AUTOMOBILE HEADLIGHT.

Application filed July 18, 1921. Serial No. 485,435.

*To all whom it may concern:*

Be it known that I, BERNHARD STERN, a citizen of the United States, and a resident of the city of New York, borough of Manhattan, in the county of New York and State of New York, have invented a new and Improved Automobile Headlight, of which the following is a full, clear, and exact description.

This invention relates to improvements in automobile headlights.

Practically every State in the Union in recent years has passed laws restricting the use of blinding headlights which serve to confuse the drivers of approaching cars. A great many headlights have been patented with various forms of dimming attachments in an attempt to comply with the laws regulating the use of the headlights. The principal disadvantage of these patented lights is the fact that they fail to give full road illumination.

An object of this invention is to provide a lamp mounted so low upon the forward end of the car that the rays from the lamp will not annoy the drivers of approaching cars.

Another object is to provide a pair of headlights capable of vertical adjustment so that they may be carried at different elevations in accordance with the pleasure of the driver of the car.

A still further object is to provide an improved mounting for the lamps which will be simple and practical in construction, strong, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:

Figure 1 is a fragmentary view in front elevation of a conventional type of automobile showing my improved headlight in applied position;

Figure 2 is a top plan view of the radiator and headlights;

Figure 3 is a view in side elevation of the radiator and lights, the dotted lines indicating the elevated position of the lights; and Figure 4 is a fragmentary detail view of the locking mechanism.

Referring in detail to the drawings, 1 represents the radiator of an automobile 2. The usual radiator frame 3 surrounds the radiator and it is to this frame that my improved lamp supporting means is attached. Angular brackets 4 secured to the sides of the radiator frame 3 include inwardly presented extensions 5 at their forward ends spaced from the front of the radiator. Brackets 6 secured to the under side of the frame 3 include upwardly presented guide bars 7 rigidly secured at their upper free ends to the extension 5 of the brackets 4 by suitable securing device such as 8.

9, 9 represent the lamp casings of my improved headlights 10. Integral guide sleeves 11 are formed on the back of the lamp casings 9. These guide sleeves encircle the guide bars 7 and permit vertical sliding movement of the lamps thereon. A cross bar 12 rigidly connects the guide sleeves. Bearing brackets 13 fixed to the forward face of the cross bar 12 cooperate with integral bearing sleeves 14 in the sleeves 11 to provide mounting for locking arms 15.

The arms 15 are mounted in the brackets 13 and sleeves 14. The arms are formed at one end with integral handle members 16 between which a coiled spring 17 is interposed. The spring 17 serves to hold the other ends of the arms in position in notches 18 in the guide bars 7 thus preventing vertical movement of the lamps.

The usual auxiliary lights 19 are mounted upon the top of the lamp casings 9 and the lead wires from the lamps allow sufficient play for the vertical adjustment of the lamps on the guide bars.

It will be noted that the preferred shape of the lamp casing is substantially rectangular which in itself diminishes unnecessary glare thrown upwardly from the headlights. The lamps are mounted so low on the front of the radiator that their light does not reach the eyes of the drivers of approaching cars.

As a matter of fact the lamps are mounted in such a manner that they would interfere with the crank handle when cranking the car and it is principally for this reason that I mount them for vertical adjustment. When it is desired to crank the car, the operator grasps the handles 16, pulls them toward each other pulling the arms 15 out of the lower notches 18, the handles 16 are then used to lift the lamps and their associated parts upwardly and the arms 15 are permitted to engage in the uppermost notches 18, locking the lamps at such an elevation that they will provide clearance for turning of the crank handle.

Although I have illustrated one of the preferred embodiments of my invention it will be apparent that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. The combination with a vehicle, of a pair of upright bars carried thereby and spaced from the forward end thereof, lamps slidable vertically on the bars, a cross piece connecting the lamps, locking members slidable on the cross piece and engageable with the bars, and an expansion spring interposed between the locking members tending to force the same into locking relation with the bars.

2. The combination with a vehicle, of a pair of upright bars carried thereby and spaced from the forward end thereof, lamps slidable vertically on the bars, a cross piece connecting the lamps, locking members slidable on the cross piece and engageable with the bars, and an expansion spring interposed between the locking members tending to force the same into locking relation with the bars, handle members on the adjacent ends of the locking members for retracting said members against the action of the spring.

3. The combination with an automobile, including a radiator and radiator frame, of vertical guide bars spaced in front of the radiator and supported by the frame, lamp casings, sleeves integral with the lamp casings slidable on the guide bars, a cross piece rigidly connecting the sleeve, and means for selectively locking the lamp in various positions of vertical adjustment.

4. The combination with an automobile, including a radiator and radiator frame, of vertical guide bars spaced in front of the radiator and supported by the frame, lamp casings, sleeves integral with the lamp casings, slidable on the guide bars, a cross piece rigidly connecting the sleeves, said guide bars having notches therein, spring pressed locking dogs slidable on the cross piece engageable in said notches to lock the lamps at various positions of adjustment.

5. In a lamp mounting the combination with an automobile radiator and frame, of brackets secured to the sides of the frame, inwardly presented arms integral with the brackets opened from the front of the frame, other brackets secured to the underside of the frame, vertical guide bars integral with said brackets and secured to the arms, lamps mounted to slide on said guide bars, means rigidly connecting the lamps, means associated with said last mentioned means for selectively locking the lamps at various elevations with the guide bars.

BERNHARD STERN.